United States Patent
Haakana et al.

(10) Patent No.: US 10,570,566 B2
(45) Date of Patent: Feb. 25, 2020

(54) AQUEOUS DISPERSIONS OF PRECIPITATED CALCIUM CARBONATE

(71) Applicants: FP-Pigments Oy, Espoo (FI); CH-Polymers Oy, Espoo (FI)

(72) Inventors: Sami Haakana, Espoo (FI); Jaana Heinonen, Raisio (FI); Päivi Miettinen, Raisio (FI)

(73) Assignee: FP-Pigments Oy, Espoo (FI)

( * ) Notice: Subject to any disclaimer, the term of this patent is extended or adjusted under 35 U.S.C. 154(b) by 0 days.

(21) Appl. No.: 15/569,829

(22) PCT Filed: Apr. 28, 2016

(86) PCT No.: PCT/FI2016/050274
§ 371 (c)(1),
(2) Date: Oct. 27, 2017

(87) PCT Pub. No.: WO2016/174309
PCT Pub. Date: Nov. 3, 2016

(65) Prior Publication Data
US 2018/0142417 A1    May 24, 2018

(30) Foreign Application Priority Data
Apr. 28, 2015  (FI) ..................................... 20155314

(51) Int. Cl.
| | |
|---|---|
| *D21H 21/52* | (2006.01) |
| *D21H 19/40* | (2006.01) |
| *C09C 1/02* | (2006.01) |
| *D21H 19/38* | (2006.01) |
| *D21H 19/58* | (2006.01) |
| *D21J 1/08* | (2006.01) |

(52) U.S. Cl.
CPC ............. *D21H 19/40* (2013.01); *C09C 1/021* (2013.01); *D21H 19/385* (2013.01); *D21H 19/58* (2013.01); *D21H 21/52* (2013.01); *D21J 1/08* (2013.01); *C01P 2004/64* (2013.01); *C01P 2006/22* (2013.01)

(58) Field of Classification Search
USPC ......................................... 162/160
See application file for complete search history.

(56) References Cited

U.S. PATENT DOCUMENTS

| | | |
|---|---|---|
| 2005/0119391 A1 | 6/2005 | Mason et al. |
| 2010/0120945 A1 | 5/2010 | Sahlberg et al. |
| 2011/0237730 A1 | 9/2011 | Buri et al. |

FOREIGN PATENT DOCUMENTS

| | | |
|---|---|---|
| WO | WO2008096274 A2 | 8/2008 |
| WO | WO 2008171771 A1 | 11/2008 |
| WO | WO2014202836 A1 | 12/2014 |
| WO | WO 2016174309 A1 | 11/2016 |

*Primary Examiner* — Mark Halpern
(74) *Attorney, Agent, or Firm* — Seppo Laine Oy

(57) ABSTRACT

A stable aqueous dispersion of platy particles and precipitated calcium carbonate, a method of producing the same and uses of the dispersion. The aqueous dispersion comprises 50 to 95 parts by weight of platy particles; and 5 to 50 parts by weight of precipitated calcium carbonate particles having an average diameter of 30 to 60 nm. The dispersion has a dry matter content of more than 30% by weight of the dispersion, and a Brookfield viscosity (100 rpm) of 200 to 5000 cP. The dispersion is suitable for forming barrier coatings on a substrate, having properties of improved gas barrier and improved mineral oil barrier.

7 Claims, 4 Drawing Sheets

AQUEOUS DISPERSIONS OF PRECIPITATED CALCIUM CARBONATE

FIELD OF INVENTION

The present invention relates to dispersion coatings. In particular, the present invention concerns dispersion coating compositions which are suitable for achieving barrier properties on substrates and methods of producing such compositions and uses thereof.

BACKGROUND ART

Polyethylene (PE), waxes and fluorocarbons are still commonly used barrier materials in paper and cardboard products. Environmentally friendly barrier solutions are however gaining more attractiveness for the packaging industry due to environmental aspects. In particular there is a demand for products which are free from barrier materials based on fossil raw-materials. Current market predictions estimate that the market share of water based barrier coating (WBBC) products will increase mainly at the expense of waxes and fluorocarbons but WBBC coating will also replace PE plastic materials.

WBBC coating compositions typically contain an aqueous polymer dispersion and platy minerals such as talcum, cf. for example WO2008141771. Such materials are capable of creating in the coating structures tortuous particle networks which enhance the barrier properties that are principally already obtainable by the application of a binder film on the surface of a substrate.

Various combinations of talc and ground calcium carbonate are disclosed in US2011237730 and WO2008096274.

Talcum or shorter "talc" is a material which is difficult to disperse into water. Furthermore, the talc plates clutter and agglomerate, which means that a significant portion of the talc loading will not contribute to achieving barrier properties. FIG. 1 shows a typical talc coating on a substrate with densely packed particles.

SUMMARY OF INVENTION

It is an aim of the present invention to remove at least a part of the problems relating to the art and to provide a novel mineral pigment composition suitable for application of a dispersion barrier coating on a substrate.

The present invention is based on the concept of dispersing talc together with calcium carbonate particles to form a stable dispersion which can the complemented with a binder and optionally other components to form a coating composition which can be used for application of a dispersion coating on a substrate.

Surprisingly, it has now been found that when providing the calcium carbonated particles in the form of precipitated calcium carbonate particles having a narrow size distribution and an average particle size in the nanometer range, and when mixing such particles in water or an aqueous solution with platy particles, for example at a weight ratio of roughly 1 to 10 up to 1:1, in particular at a weight ratio of 1:5 to 1:3, efficient dispersion of the talc in an aqueous medium can be reached.

The composition thus obtained can be combined with water, optionally together with dispersion media known per se, to provide a coating composition suitable for dispersion coating of substrates, such as paper and cardboard.

More specifically, the present aqueous dispersion is mainly characterized by what is stated in the characterizing part of claim 1.

The present method is characterized by what is stated in the characterizing part of claim 16.

The uses are characterized by what is stated in claims 22 to 27 and the present coating composition is characterized by what is stated in the characterizing part of claim 28.

Considerable advantages are obtained by the present invention. Thus, stable dispersions are readily obtained, which have a shelf-life of greater than one month, typically greater than two months.

Further, the coating compositions have a high solids (dry matter) content which will allow for facile removal of water after coating.

It has been found that PCC particles with average diameters in the nanometer range will efficiently act as thickening agents in the dispersions which attributes to the excellent coating properties. The amounts of conventional thickeners can be reduced or even eliminated altogether. Such thickeners are known for impairing barrier properties of dispersion coatings.

The present dispersion coatings exhibit improved gas barrier and improved mineral oil barrier properties, and are suitable in particular for producing materials for containing and wrapping foodstuff.

Next the present technology will be examined more closely with the aid of exemplifying embodiments and by referring to the attached drawings.

EMBODIMENTS

Figure 1:
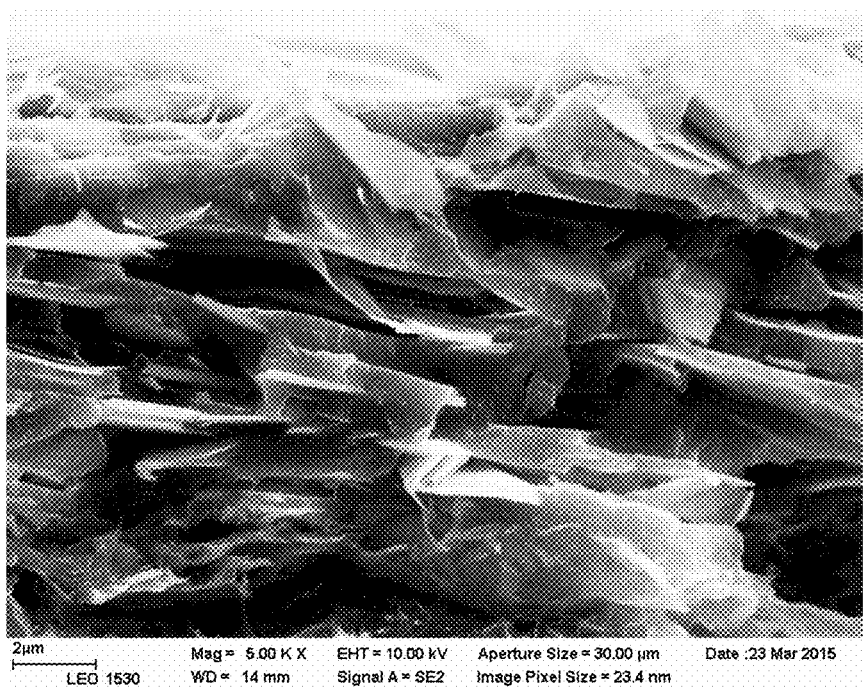
FIGS. 1 to 3 are scanning micrographs (in the following also "SEMs") of a talc dispersion used for reference showing the packing of talc particle.
Figure 2:
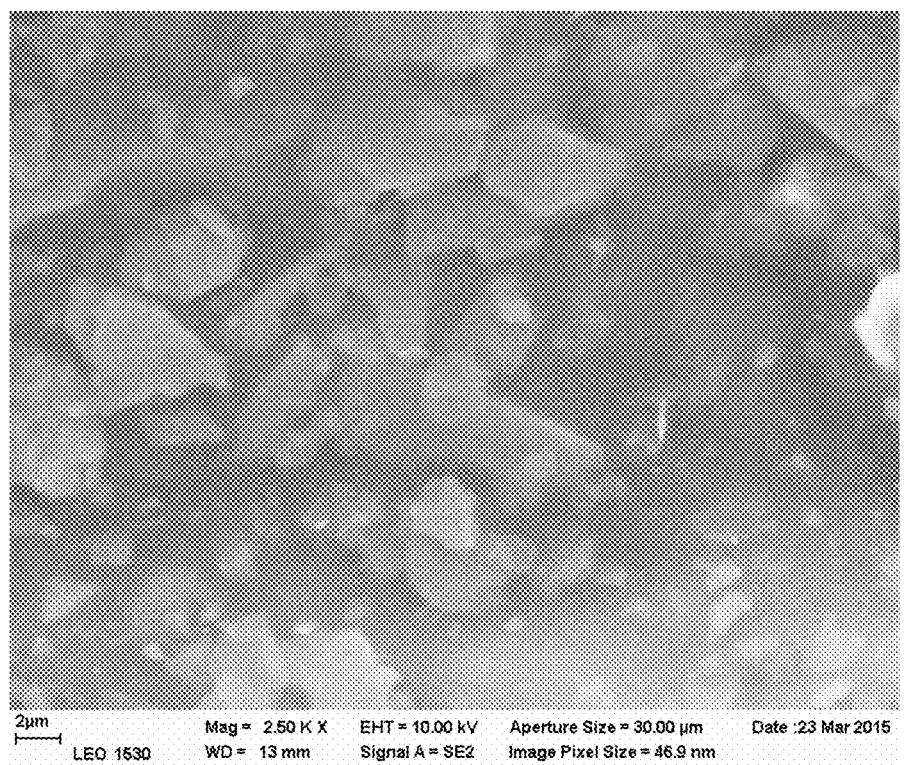
Figure 3:
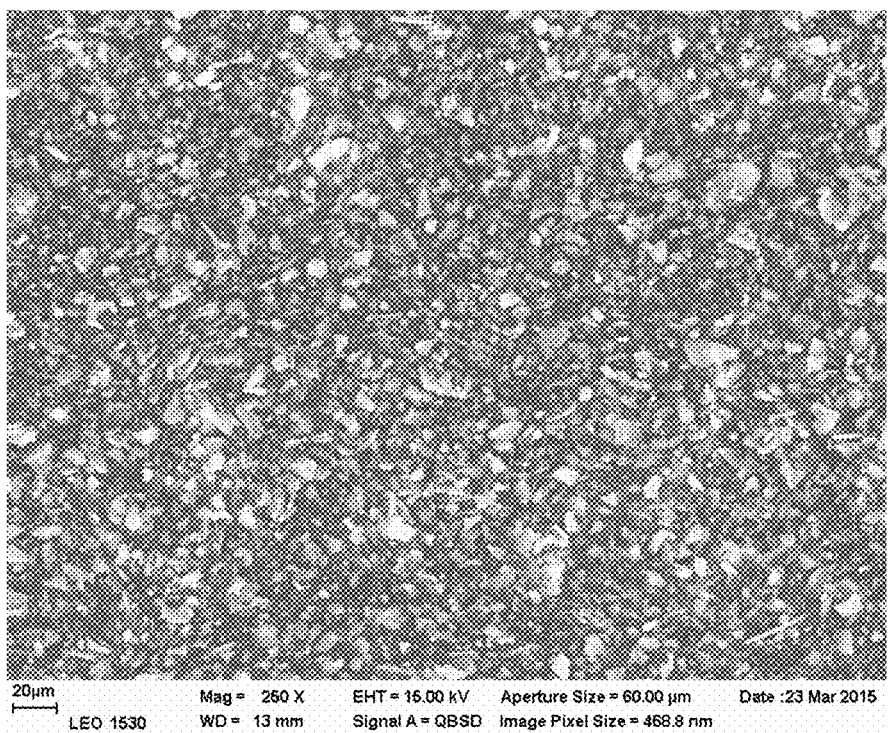
Figure 4:
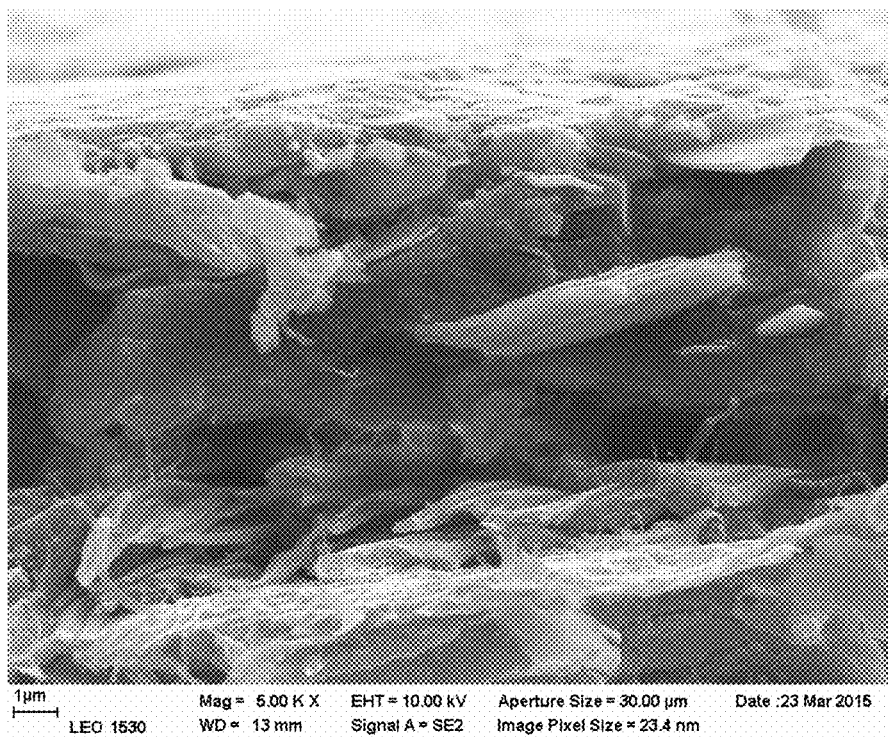
FIGS. 4 to 6 are corresponding SEMs of dispersions according to embodiments of the present technology.
Figure 5:
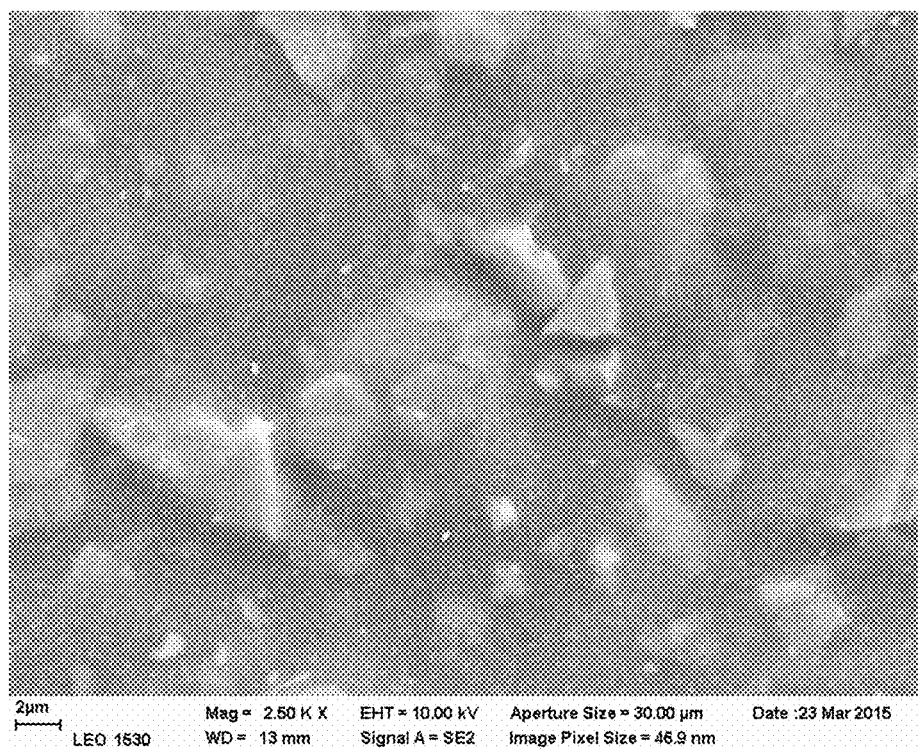
Figure 6:
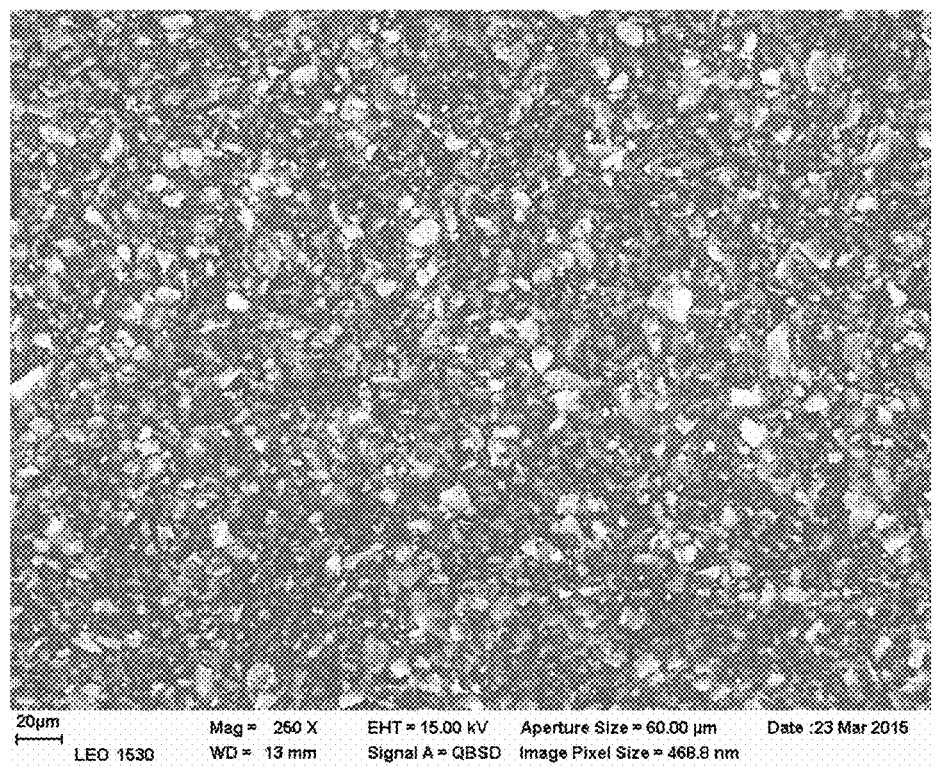

As discussed above, in one embodiment the present technology comprises providing a stable aqueous dispersion of platy particles and precipitated calcium carbonate. The dispersion typically comprises
  50 to 95 parts by weight of platy particles; and
  5 to 50 parts by weight of precipitated calcium carbonate particles having an average diameter of 30 to 60 nm.

The term "stable" when used in connection to the present dispersion indicates that typically less than 5 wt %, preferably less than 1 wt %, of the suspended solid matter settles out upon standing for 30 days at 10 to 50° C.

In an embodiment, the dispersion has a dry matter content of more than 30% by weight of the dispersion, in particular 40 to 60% by weight of the dispersion. The viscosity (Brookfield viscosity at 100 rpm) is typically 200 to 5000 cP, suitably 300 to 2500 cP, for example 400 to 2500 cP, in particular about 500 to 2000 cP, for example about 1000 to 2000 cP.

In one embodiment, the dispersion comprises 60 to 85 parts, in particular 70 to 80 parts, by weight of platy particles and 15 to 40 parts, in particular 18 to 28 parts, by weight of precipitated calcium carbonate particles.

The platy particles can be selected from the group of talc, kaolin and bentonite and combinations thereof, talc and mixtures of talc and other particles being particularly preferred.

The talc used typically has a particle size (Sedigraph Particle size) of typically less than 50 um. In one embodiment, the medium particle size (d50) of the talc is about 1 to 10 um. The proportion of particles smaller than 2 um is, for example, about 10 to 60% by weight.

A suitable dispersion can be obtained by dispersing, in an aqueous phase, 50 to 95 parts by weight of platy particles, for example talc, together with 5 to 50 parts by weight of particles of precipitated calcium carbonate having an average diameter of 30 to 60 nm in a zone of high shear forces.

In a preferred embodiment, the aqueous phase comprises an aqueous slurry or dispersion of precipitated calcium carbonate particles having an average diameter of 30 to 60 nm in water.

In the present context, the PCC particles are characterized as having a "diameter" of 30 to 60 nm. This is not to be taken as a positive indication that all of the particles are spherical although it is believed that at least a considerable part of them roughly meets the above given definition for spherical particles. Broadly, the term "diameter" designates that the particles have an average size in the indicated range. Typically, the smallest diameter is 20 nm.

Figure 7:
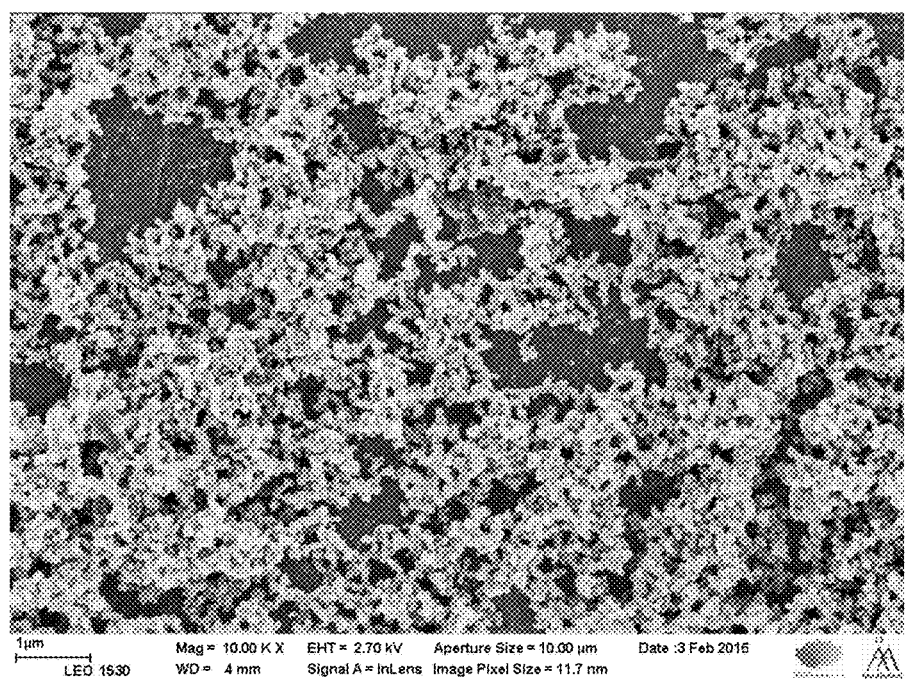
FIG. 7 shows an SEM of one pure nano-PCC product used in the present invention.

Suitable PCC particles can be produced for example as disclosed in WO2014202836, the contents of which are herewith incorporated by reference. The particle size of the PCC particles is given as Sedigraph Particle size. The particle size can also be confirmed as well as assessed and determined from SEM images for example of the pure nano-PCC product. In this respect we refer to the SEM giving in FIG. 7 which shows the particles of the present products. From the SEM, the particle sizes can readily be assessed.

In one embodiment, the production method comprises the steps of continuously feeding calcium hydroxide as fine drops and/or particles into gas which contains carbon dioxide and which is inside a precipitation reactor, in order to carbonate the calcium hydroxide, i.e. in order to produce precipitated calcium carbonate in the precipitation reactor.

Calcium hydroxide or other suitable $Ca^{++}$ ion sources can be used as a reactive mineral substance, from which calcium carbonate is formed using carbon dioxide. Typically, calcium hydroxide is fed into the precipitation reactor as a calcium hydroxide sludge, i.e. as calcium hydroxide dispersed in water, such as lime milk, but it can also be fed in as a calcium hydroxide solution. The material is advantageously fed into the reactor through a disintegration and spraying apparatus located in the reactor or in association with it.

In the method, a disintegration and spraying apparatus of the so-called impact mixer type can be employed. In that kind of mixer, very fine drops and/or particles are formed from the calcium hydroxide sludge or solution.

In addition to the calcium hydroxide sludge, a gas containing carbon dioxide which effects precipitation and which may be pure or nearly pure carbon dioxide, or combustion gas, or other suitable gas containing $CO_2$, is continuously fed into the precipitation reactor.

In order to produce the small particles desired it is advantageous to arrange for precipitation to take place in a lowered reaction temperature, below 65° C., typically at 10-65° C., more typically at 30-65° C., most typically at a temperature below 40° C.

The dispersion of PCC particles in water will have a dry matter content of about 5 to 50%, in particular about 28 to 42%, by weight of the total mass of the dispersion.

In addition to providing, as a starting material for the present process, an aqueous dispersion of PCC particles having an average size of about 30 to 60 nm, it is also possible to provide an aqueous dispersion containing PCC agglomerates, typically having a size of 2 to 40 um, formed by primary PCC particles having an average size in the cited range of 30 to 60 nm. Such agglomerates and aqueous dispersions containing the same are disclosed in WO2014202836.

Thus, in one embodiment, a dispersion of talc and PCC particles in an aqueous phase is obtained by dispersing 50 to 95 parts by weight of platy particles together with 5 to 50 parts by weight of granules of precipitated calcium carbonate having an average size of about 2 to 40 um, in particular about 2.5 to 30 um, preferably about 4 to 15 um, said granules being capable of liberating primary particles having an average diameter of 30 to 60 nm.

In one embodiment, talc or similar platy particles are dispersed into an aqueous dispersion of particles of precipitated calcium carbonate having an average diameter of 30 to 60 nm (or agglomerates formed by such primary particles) in a zone of high shear forces.

In the present context, in a zone of high shear forces, the shear rate is typically in the range of 1 to 10000 $s^{-1}$, typically between 10 and 1000 $s^{-1}$.

In one embodiment, a zone of high shear forces is formed by an impact mixer or a cascade of impact mixers.

As a result of any one of the above embodiment, dispersion of talc into an aqueous ambient with nanosize PCC particles will give rise to a stable dispersion. In the dispersion, the particles of precipitated calcium carbonate particles disperse the platy particles, in particular such that the platy particles are at least partially separated from each other.

Surprisingly it has been found that the dispersed talc particles, which are "spaced apart" on one or several sides of the particles from other talc particles by the PCC particles will be capable of forming an efficient barrier when deposited as a layer on a substrate. Typically, the thickness of such a layer will be in the range of 0.1 to 100 um, in particular about 1 to 10 um.

For producing a suitable coating composition, the dispersion of talc and PCC will be mixed with a water-soluble or water-dispersible binder.

In one embodiment, the dispersion is mixed with and added amount of 1 to 75%, for example 15 to 65%, in particular 20 to 60%, by weight of the dry matter of a water-soluble or water dispersible binder.

In one embodiment, the binder is selected from polymer latexes, such as styrene acrylates, acrylates or vinyl acetate acrylate latexes, or mixture thereof, or water-soluble derivative of natural polymers, such as starch, protein, carboxy methyl cellulose or other cellulose derivatives, or synthetic polymers, such as polyvinyl alcohol, or mixtures of two or more of the said binders.

Typically, the binder is added to the aqueous dispersion in the form of an aqueous composition having a dry matter content of 30 to 70 wt %, in particular about 40 to 60 wt %.

The dispersion obtained, having a dry matter of 40 to 60% by weight, has for example a Brookfield viscosity (100 rpm) of generally 200 to 5000 cP, such as 300 to 2500 cP, in particular 400 to 2000 cP, for example 400 to 2000 cP, for instance 1000 to 2000 cP.

In an embodiment, the dispersion is free or essentially free from added thickening agent. It is a particular advantage that the PCC component will assist in achieving a suitable viscosity without the addition of conventional thickeners which may impair barrier properties.

Based on the above, one preferred embodiment, comprises an aqueous composition of coating particles and a binder suitable for forming a dispersion barrier coating on a substrate, comprising 50 to 95 parts by weight of platy particles; and
5 to 50 parts by weight of precipitated calcium carbonate particles having an average diameter of 30 to 60 nm;

the composition having a dry matter content of more than 30% by weight of the composition, and a Brookfield viscosity (100 rpm) of 300 to 2500 cP, said composition further containing 1 to 75% by weight of the dry matter of a water-soluble binder.

One embodiment of the coating composition comprises 40 to 60 parts by weight of talc, 20 to 30 parts by weight of precipitated calcium carbonate, and 15 to 65%, in particular 20 to 60%, by weight of the dry matter of a water-soluble binder. The composition exhibits a Brookfield viscosity (at 100 rpm) of 1000-2000 cP.

As referred to above, the present aqueous dispersion can be used for forming a dispersion barrier coating on a substrate. In particular the substrate to be coated is selected from the group of fibrous substrates, in particular porous fibrous substrates, for example substrates containing cellulosic or lignocellulosic fibres or combinations thereof. Papers and cardboard sheets and webs and blanks are examples of particularly suitable substrates.

In one embodiment, the aqueous suspension is applied on the substrate at 1 to 25 g/m$^2$, in particular 5 to 20 g/m$^2$, for example at 5 to 15 g/m$^2$ per side of the substrate.

The aqueous dispersion can be applied on the substrate in the form of one layer or a plurality of overlapping layers.

The following non-limiting examples will illustrate embodiments.

Example 1

An aqueous suspension was produced by dispersing talc into an aqueous slurry of nanosized PCC particles obtained as described in WO2014202836. The talc used had a medium particle size (d50) of 3.0 μm, 34 wt % of the particles being smaller than 2 μm.

Thus, 75 parts by weight of talc were dispersed into an aqueous slurry of 25 parts by weight of nanosized PCC particles using an ATREX mixer (an impact mixer capable of achieving a zone of high shear forces).

The obtained dispersion had a dry matter content of about 50%. The dispersions were highly viscous. Upon standing for extended times of more than 30 days at room temperature (25° C.), no settling out of solid matter could be noted.

To produce a suitable coating composition, a binder consisting of synthetic styrene acrylate latex was added to the PCC dispersion in an amount of about 50 parts by weight of solid matter. The latex added had a dry matter content of 50% by weight. The binder was added by mixing in a conventional blade mixer. The composition thus obtained was still complemented with conventional dispersion aids, such as biocides. The dry matter content of the coating compositions was about 50%.

Just like the PCC dispersions, the coating compositions were stable and no solid matter settled out from the composition when it was allowed to stand for more than 30 days at room temperature.

For comparative purposes, talc dispersions were also provided as reference.

SEM analysis was carried out, and the results are shown in the attached SEM pictures.

As will appear from the SEM electrographs, in the reference the talc particles are densely packed. By contrast, in the present trial the talc particles are separated and located further from each other. The nanosized PCC can be seen in the surface pictures as a hazy material.

A similar difference in the extent of packing of the talc particles can be seen in the cross-sections. The trial shows nanosized PCC can be seen in the surface structure mixed with the binder.

The coating compositions were utilized for the following coating experiments.

Example 2

Three different pilot coating trials were conducted. Two of the trials were made to pre-coated LWC base paper, one for the pre-coated paperboard.

The following barrier analyses were done from the obtained WBBC paper paperboards: KIT, oxygen, water vapor, grease and oil barrier.

Tables 1-3 below show the trial design, the obtained quality of the coating pasta and the measured barrier values.

TABLE 1

Pilot coating trial 1

| Basepaper - precoated LWC TRIAL 1 | | Solids % | Reference | Trial | |
|---|---|---|---|---|---|
| Raw materials | | | | | |
| Waterbased binder | | 49.6 | 60 | 70 | |
| Conventional platy like mineral | | 63.2 | 40 | 0 | |
| Novel pigment mixture | | 50.9 | 0 | 30 | |
| Coating recipe | Solids % | | 53.7 | 49.3 | |
| | pH | | 7.7 | 8.1 | |
| | Viscosity (Br 100) | | 370 | 490 | |
| Results | Coat weight [g/m$^2$] | | 11.3 | 10.8 | g/m$^2$ |
| | KIT | | <6 | <6 | |
| | WVTR, RH 50%, 25° C. | | 53 | 43 | g/m$^2$/24 h |
| | Oil barrier | | 13 | 9.5 | min. |
| | Grease barrier | | 21 | 21 | |
| | O$_2$TR, 23° C./05 RH | | >20000 | 11300 | cc/m$^2$/24 h |

TABLE 2

Pilot coating trial 2

| Basepaper - precoated LWC TRIAL 2 | | Solids % | Reference | Trial | |
|---|---|---|---|---|---|
| Raw materials | | | | | |
| Waterbased binder | | 49.0 | 60 | 60 | |
| Conventional platy like mineral | | 62.2 | 40 | 0 | |
| Novel pigment mixture | | 55 | 0 | 40 | |
| Coating recipe | Solids % | | 54.3 | 51.8 | |
| | pH | | 7.9 | 8.0 | |
| | Viscosity (Br 100) | | 625 | 598 | |
| Results | Coat weight [g/m$^2$] | | 9.2 | 8.1 | g/m$^2$ |
| | KIT | | <6 | 6 | |
| | WVTR, RH 50%, 25° C. | | 24.8 | 24.6 | g/m$^2$/24 h |
| | WVTR, RH 75%, 25° C. | | 24.8 | 24.6 | g/m$^2$/24 h |
| | Oil barrier | | 1.5 | 3 | min. |
| | Grease barrier | | 161 | 161 | |

TABLE 2-continued

Pilot coating trial 2

| Basepaper - precoated LWC TRIAL 2 | | Solids % | Reference | Trial | |
|---|---|---|---|---|---|
| Raw materials | | | | | |
| | $O_2TR$, 23° C./ 05 RH | | >20000 | 1600 | $cc/m^2/$ 24 h |

TABLE 3

Pilot coating trial 3

| Basepaper - precoated LWC TRIAL 1 | | Solids % | Reference | Trial | |
|---|---|---|---|---|---|
| Raw materials | | | | | |
| Waterbased binder | | 49.0 | 60 | 60 | |
| Conventional platy like mineral | | 62.2 | 40 | 0 | |
| Novel pigment mixture | | 55.0 | 0 | 40 | |
| Coating recipe | Solids % | | 53.4 | 49.5 | |
| | pH | | 8.3 | 8.3 | |
| | Viscosity (Br 100) | | 570 | 670 | |
| Results | Coat weight [g/m²] | | 11.6 | 14.7 | $g/m^2$ |
| | KIT | | 12 | 12 | |
| | WVTR, RH 50%, 25° C. | | 33.6 | 25.8 | $g/m^2/$ 24 h |
| | Grease barrier | | 48 | 54 | |
| | $O_2TR$, 23° C./ 05 RH | | >20000 | 6600 | $cc/m^2/$ 24 h |

As will appear from the results presented in the tables, water based barrier coating with the novel mixture of conventional platy like mineral and nanosized $CaCO_3$ based pigment improves oxygen and water vapor barriers and maintains the KIT, grease and oil barriers when compared to conventional platy like mineral containing WBBC.

It was also seen that pilot coater runnability was better with novel pigment mixture compared to pure conventional platy like mineral containing WBBC.

Without wishing to be bound to any particular theory, it seems that one reason for the improved barrier properties obtained with the novel pigment mixtures are due to a more closed coating surface structure as well as to tortuous pigment particle network. This can be seen in the attached SEM images.

INDUSTRIAL APPLICABILITY

The present coating dispersions can be used for achieving a barrier coating on any substrate, the coating having properties of improved gas barrier, in particular improved oxygen barrier. The aqueous dispersion can also be used for achieving a barrier coating on the substrate, having properties of improved mineral oil barrier.

Food packages and food wrappings are particularly interesting applications.

CITATIONS LIST

Patent Literature

WO2008141771
WO2014202836
US2011237730
WO2008096274

The invention claimed is:

1. A method of producing a stable aqueous dispersion of platy particles and precipitated calcium carbonate particles, comprising dispersing, in an aqueous phase, together:
   50 to 95 parts by weight of the platy particles; and
   5 to 50 parts by weight of the precipitated calcium carbonate particles, the precipitated calcium carbonate particles having an average diameter of 30 to 60 nm; and
   wherein the dispersing of the platy particles and the precipitated calcium carbonate particles in the aqueous phase is done at a shear rate in a range of from 1 to 10000 $s^{-1}$ to provide the dispersion with a dry matter content of more than 30% by weight of the dispersion, and a Brookfield viscosity (100 rpm) of 200 to 5000 cP.

2. The method according to claim 1, wherein the platy particles are dispersed into an aqueous dispersion of the precipitated calcium carbonate particles having an average diameter of 30 to 60 nm at the shear rate.

3. The method according to claim 1, comprising dispersing, in an aqueous phase, the 50 to 95 parts by weight of platy particles together with 5 to 50 parts by weight of granules of precipitated calcium carbonate having an average size of about 2 to 40 μm, wherein said granules liberate the precipitated calcium carbonate particles having an average diameter of 30 to 60 nm when subjected to shear forces at the shear rate in the aqueous dispersion.

4. The method according to claim 1, wherein the dispersing is done via an impact mixer or a cascade of impact mixers.

5. The method according to claim 1, wherein the shear rate is in the range of between 10 and 1000 $s^{-1}$.

6. The method of claim 1, wherein the dispersion comprises a Brookfield viscosity of 300 to 2500 cP.

7. The method of claim 1, wherein the dispersion comprises a Brookfield viscosity of 400 to 2000 cP.

* * * * *